US006589121B1

United States Patent
Leonard

(10) Patent No.: US 6,589,121 B1
(45) Date of Patent: Jul. 8, 2003

(54) FULLY ADJUSTABLE TORQUE CONTROLLER, CLUTCH AND BRAKE

(75) Inventor: Hamlin Leonard, Darien, CT (US)

(73) Assignee: Halo Product Innovations, Wilton, CT (US)

( * ) Notice: Subject to any disclaimer, the term of this patent is extended or adjusted under 35 U.S.C. 154(b) by 70 days.

(21) Appl. No.: 09/668,268

(22) Filed: Sep. 18, 2000

Related U.S. Application Data

(60) Provisional application No. 60/187,509, filed on Mar. 7, 2000, provisional application No. 60/179,579, filed on Feb. 1, 2000, and provisional application No. 60/154,745, filed on Sep. 17, 1999.

(51) Int. Cl.⁷ .............................. F16D 7/08; F16D 11/16
(52) U.S. Cl. ..................... 464/37; 192/93 C; 192/46; 464/82
(58) Field of Search ............................. 464/37, 51, 81, 464/82, 160, 185; 192/56.1, 46, 84.7, 93 C

(56) References Cited

U.S. PATENT DOCUMENTS

| 2,501,648 | A | * | 3/1950 | Ogden ........................ 192/55.1 |
| 2,514,228 | A | * | 7/1950 | Dodge ..................... 192/104 C |
| 2,930,212 | A | * | 3/1960 | Muller et al. ............... 192/56.1 |
| 3,305,058 | A | * | 2/1967 | Orwin et al. ................ 192/150 |
| 3,593,542 | A | * | 7/1971 | Urayama ...................... 464/37 |
| 4,102,154 | A | * | 7/1978 | Dahlstrand, Jr. ........ 192/104 R |
| 4,570,769 | A | * | 2/1986 | Isaka ....................... 192/107 T |
| 5,000,721 | A | * | 3/1991 | Williams ..................... 192/46 |
| 5,088,581 | A | * | 2/1992 | Duve .................... 192/107 M |
| 5,590,550 | A | * | 1/1997 | Savkar et al. ................. 192/46 |
| 5,799,716 | A | * | 9/1998 | Yamaguchi et al. ........ 160/291 |
| 6,033,106 | A | * | 3/2000 | Lesimple et al. ........... 192/56.1 |
| 6,220,970 | B1 | * | 4/2001 | Berger et al. ................ 464/180 |

* cited by examiner

Primary Examiner—Lynne H. Browne
Assistant Examiner—Kenn Thompson

(57) ABSTRACT

A torque coupler for coupling rotatable inner and outer parts. The torque coupler comprises an inner slip section, and an outer slip section. The inner slip section is connected to the inner rotatable part to rotate with the inner part when the inner part is rotating. The inner slip section has an outer circumferential surface disposed around the inner part. The outer surface has a predetermined number of detents formed therein. The outer slip section is connected to the outer rotatable part to rotate with the outer part when the outer part is rotating. The outer slip section is seated against the inner slip section with an inner surface of the outer slip section in contact with the outer surface of the inner slip section. The inner surface of the outer slip section has a predetermined number of spring loaded teeth. The spring loaded teeth are biased for engaging the detents in the outer surface of the inner slip section to lock to the inner slip section and the outer slip section, and transfer an applied torque between the inner and outer parts.

30 Claims, 10 Drawing Sheets

FULLY ADJUSTABLE TORQUE CONTROLLER, CLUTCH AND BRAKE

CROSS-REFERENCE TO RELATED APPLICATIONS

This application claims the benifit of U.S. Provisional Applications Nos. No. 60/154,745 filed Sep. 17, 1999 No. 60/179,579 filed Feb. 1, 2000 No. 60/187,509 filed Mar. 7, 2000

BACKGROUND OF THE INVENTION

1. Field of the Invention

The present invention relates to torque controllers and torque limiters and, more particularly, to fully adjustable torque controllers and limiters for rotationally driven systems.

2. Prior Art

In order to protect rotating mechanical systems from damage caused by loads that exceed the limit for which the system was designed, a series of devices called torque limiters have been employed. They are also sometimes called torque limiting clutches. Torque limiters are generally energy or load dumping devices which interface between motive parts of a system and act to prevent damage to the motive parts under excessive loading conditions which are inadvertently imposed on the motive parts. The use of torque limiters in motive systems is highly desirable in order to accurately limit the maximum loading condition to which a system will be subjected, and hence, do away with any reasonable possibility that the system will be subjected to undesired loads. Providing an accurate limit to the maximum loading condition on a system facilitates a reduction in the size, weight, and complexity of the motive parts of the system with an associated reduction in the cost of the parts. Nevertheless, torque limiters of the prior art used on rotating or shaft driven systems have been large, heavy, bulky, complex, and expensive devices, rendering them unsatisfactory for most applications. The prior art torque limiters tend to be of two types. One type of torque limiter of the prior art operates based on friction, generally using either slip clutches and/or visco-elastic materials to absorb excess energy. This friction type of torque limiter in effect converts the excess load into thermal energy (i.e. heat). The heat generated by the torque limiter subjects the torque limiter and adjoining parts to high temperatures, unless the heat generated by the torque limiter is transferred by suitable means away from the torque limiter. Thus, friction type torque limiters of the prior art must employ materials suitable for use at high temperatures, and must be provided with heat dissipation means resulting in increased size, weight, complexity, and cost of this type of torque limiters. Although slip repeat capability has a broad tolerance ($\approx \pm 10\%$), friction clutches do reengage automatically when the overload subsides without the need to shut down, thereby avoiding costly downtime. Periodic adjustment and friction lining replacement is required depending upon torque, frequency and duration of activation, and rotational speed of operation. These conventional devices do not function well under adverse ambient conditions because of changes in the coefficient of friction.

Another type of torque limiter of the prior art used on rotating drive systems generally relies on spring loaded rollers or balls which engage complementing pockets or detents to transfer torque between outer and inner rings of the torque limiter. When the torque across the torque limiter exceeds a predetermined amount the spring loaded balls are disengaged from the pockets allowing the outer and inner rings to slip relative to each other. This type has less friction, lasts longer, and repeats more accurately ($\pm 3$ to $5\%$) than the friction type. They can also reset to a precise orientation. Spring loaded ball torque limiters are however large, heavy and costly arising from the large number of parts used to hold and support many individual balls and springs in the torque limiter. Each application appears unique and involves a large number of independent design variables. There is no industry standard. Many manufacturers produce ball type torque limiters, serving a limited market, with a diversity of design and custom machined parts, all of which means low volume and high cost. These limiters are not modularized, adding to the diversity of models and further cutting the size of production runs. The torque limiter of the present invention overcomes the problems of the prior art.

SUMMARY OF THE INVENTION

In accordance with a first embodiment of the present invention, a torque coupler for coupling rotatable inner and outer parts is provided. The torque coupler comprises an inner slip section, and an outer slip section. The inner slip section is connected to the inner rotatable part to rotate with the inner part when the inner part is rotating. The inner slip section has an outer circumferential surface disposed around the inner part. The outer circumferential surface has a predetermined number of detents formed therein. The outer slip section is connected to the outer rotatable part to rotate with the outer part when the outer part is rotating. The outer slip section is seated against the inner slip section with an inner surface of the outer slip section in contact with the outer surface of the inner slip section. The inner surface of the outer slip section has a predetermined number of spring loaded teeth which are biased for engaging the detents in the outer surface of the inner slip section. This engagement locks the inner slip section and the outer slip section and transfers an applied torque between the inner and outer mating parts.

In accordance with a second embodiment of the present invention, a torque limiter coupling for coupling rotatable radially spaced first and second parts is provided. The torque limiter coupling comprises a first slip ring and a second slip ring. The first slip ring is sized and shaped to be fixedly mounted onto the first rotatable part. The first slip ring has a circumferential slip surface disposed radially between the first and second parts when the slip ring is mounted onto the first part. The slip surface has a number of detents formed therein. The second slip ring is sized and shaped to be fixedly mounted onto the second rotatable part. The second slip ring has a predetermined number of resilient spring fingers extending radially between the first and second parts when the second slip ring is mounted onto the second part. Each of the resilient spring fingers has a tooth at a tip of the spring finger for engaging a corresponding one of the detents on the first slip ring. This engagement transfers torque between the first slip ring and the second slip ring.

In accordance with a third embodiment of the present invention, an adjustable torque limiting coupling for coupling rotatable radially spaced first and second parts is provided. The torque limiting coupling comprises a housing, a slip ring, a slip assembly, and a spring preload adjustment mechanism. The housing is adapted to be fixedly mounted to the first rotatable part to rotate with the first part. The slip ring is disposed in the housing. The slip ring has a bore therein for mating the slip ring to the second rotatable part to rotate with the second rotatable part. The slip ring has a circumferential slip surface radially spaced relative to the second part when the slip ring is mated to the second part. The slip surface has a number of detents formed therein. The slip assembly is connected to the housing to rotate with the housing. The slip assembly interfaces radially between the slip ring and the housing. The slip assembly comprises a slip pad, with a predetermined number of teeth, and a multiple spring member. The multiple spring member biases the slip pad against the circumferential slip surface of the slip ring, and engages the teeth of the slip pad to the detents on the slip ring. The spring preload adjustment mechanism is connected to the housing for adjusting the spring preload of the multiple spring member against the slip pad. The spring preload adjustment mechanism is adjustable when at least one of the first, or second rotatable parts is rotating.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
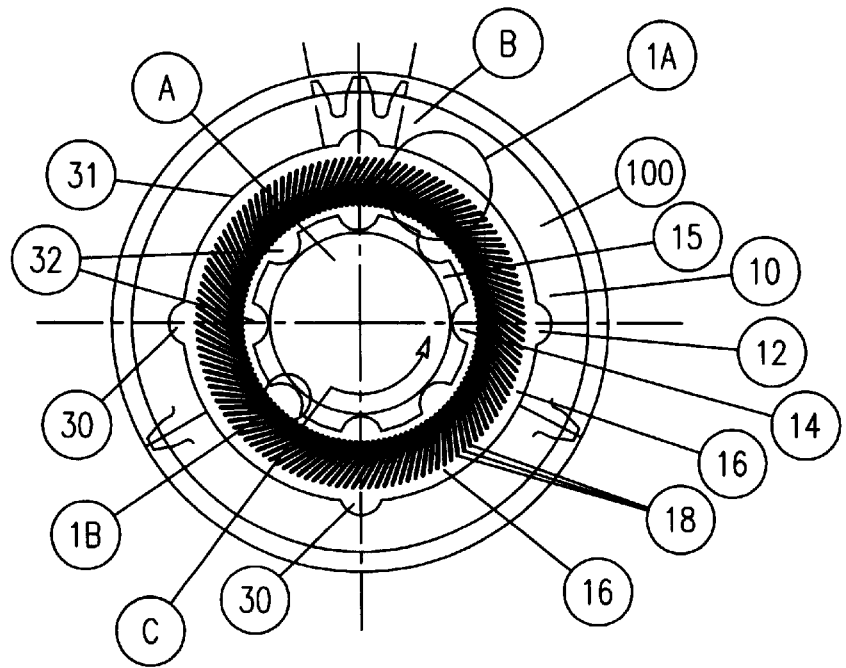
FIG. 1 is an end elevation view showing a gear mounted to a drive shaft using a torque limiter incorporating features of the present invention in accordance with a first preferred embodiment of the present invention.

Referring to FIG. 1, there is shown an end view of a torque limiter or torque controller 10 incorporating features of the present invention, and rotatable inner and outer parts A, B. Although the present invention will be described with reference to the single embodiment shown in the drawings, it should be understood that the present invention can be embodied in many alternate forms of embodiments. In addition, any suitable size, shape or type of elements or materials could be used.

Still referring to FIG. 1, the torque limiter 10 generally comprises an outer ring or multiple spring ring 12 and an inner ring 14. The inner ring 14 is removably mounted within the multiple spring ring 12. The multiple spring ring 12 is generally adapted to be mounted in an outer or female part B, such as a gear, or pulley of a rotary powered or driven system. The inner ring 14 has an inner bore 15 generally adapted to receive a male part of a drive shaft of the rotary powered system. Hence, the torque limiter 10 provides an interface between a driven section and a driver section of the rotary powered system. In FIG. 1, the inner part A is the driver and the outer part B is driven, though in alternate embodiments the outer part may be the driver and the inner part may be driven. The multiple spring ring 12 has multiple spring members 18 which resiliently engage the inner ring 14 of the torque limiter 10. The spring members 18 of the multiple spring ring 12 rotationally hold the inner ring 14 relative to the multiple spring ring 12 transferring all torque between the drive shaft and the driven piece until the torque applied across the torque limiter 10 exceeds a predetermined amount. When the torque across the limiter 10 exceeds the predetermined amount, the multiple spring members of the multiple spring ring resiliently deflect, disengaging from the inner ring 14, and thereby allowing the inner ring 14 to slip relative to the multiple spring ring 12. The relative slip between the inner ring 14 and the multiple spring ring 12 causes excess torque to be dumped. The relative slip between the inner ring 14 and the multiple spring ring 12 continues until the torque across torque limiter 10 is once again below the predetermined amount.

Figure 1A:
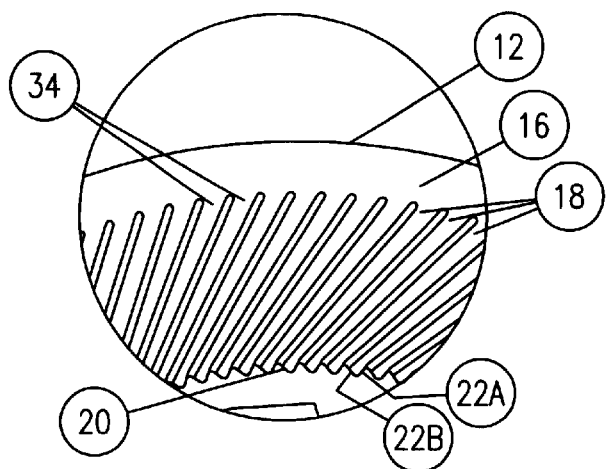
FIGS. 1A–1B are respectively a partial expanded view of a multiple spring ring of the torque limiter shown in FIG. 1, and a partial expanded view of an inner ring of the torque limiter shown in FIG. 1.
Figure 1B:
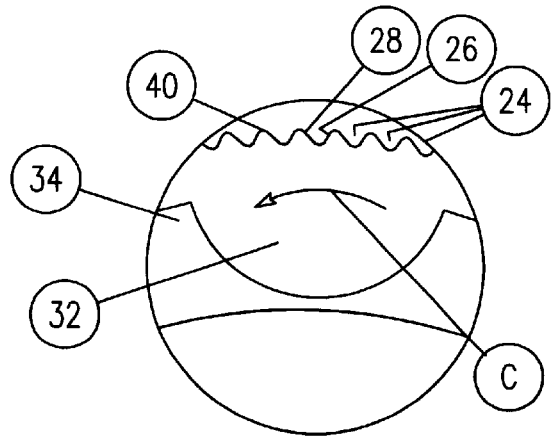

Referring now also to FIGS. 1A–1B, the multiple spring ring 12 of the torque limiter 10 is a one piece member made from a suitable material such as metal having a suitable elastic modulus, for example 7075 Al T6, or stiff plastic. The multiple spring ring 12 generally includes a hoop section 16 having a desired number of resilient cantilevers depending therefrom to form springs 18. In the preferred embodiment, the multiple spring ring 12 is the outer ring of the torque limiter 10. In alternate embodiments, the multiple spring members may be cantilevered from the inner ring to resiliently engage the outer ring of the torque limiter. In the preferred embodiment, the multiple spring ring 12 has 128 spring members 18, though any suitable number may be used, disposed substantially equally around the hoop section 16. The spring members 18 project inwards from the hoop section 16. As shown in FIG. 1, the spring members 18 are radially racked or angled so that the tip 20 of each spring member 18 is offset relative to a radial extending from the base 34 of the spring member 18 to the center of the multiple spring ring 12. The spring members 18 are angled in the same rotational direction in which the drive shaft 200 turns. For example, if the drive shaft A turns counter-clockwise as indicated by arrow C (see FIG. 1), then the spring members 18 on the multiple spring ring 12 are also angled counter-clockwise. The spring members 18 may be generally curved so that each spring member 18 is longitudinal cambered (not shown). The spring members 18 are generally tapered longitudinally, approximating a generally parabolic shape, so that the each member 18 is wider at the base 34 than at the tip 20. This tapered generally parabolic shape gives the spring member 18 a substantially uniform stress distribution along the beam, and allows the tip 20 of the beam to be deflected about 1.6 times greater without overstressing the root 34 in comparison to a non-tapered beam. The advantage is that the larger displacement opens up the tolerances required to get accurate repeatability. With a pre-load on the spring members 18, a spring life of about at 10 million cycles may be expected. In alternate embodiments, the spring members may have a substantially straight longitudinal shape, or may have any other suitable shape. The spring members 18 may have any suitable length and rake angle in order to effect the desired flexibility of the spring member. The tips 20 of the spring members 18 each have a leading cam surface 22A and a bottom stopping surface 22B. The outer surface 31 of the multiple spring ring 12 has ridges or keys 30 projecting therefrom. The width of the multiple spring ring 12 may be as desired to obtain the desired torque resistance from the torque controller 10.

As seen best in FIG. 1B, the inner ring 14 of the torque limiter has an outer surface 40 with detents 24 formed therein. The detents 24 in the outer surface 40 are located to receive the tips 20 of spring members 18, when the inner ring 14 and multiple spring ring 12 are mated (see FIG. 1). The inner ring 14 may have an equal number of detents 24 as the number of spring members 18 on the multiple spring ring 12. By way of example, if the multiple spring ring 12 has 128 spring members 18, then the inner ring 14 is provided with 128 detents 24. In this case, when the multiple spring and inner rings 12, 14 are mated as shown in FIG. 1, the tip 20 of each spring member 18 is located in a corresponding detent. The inner ring 14 may also be provided with fewer detents 24 than the number of spring members 18 disposed on the multiple spring ring 12, such that, when the multiple spring and inner rings are mated only a desired portion of the spring members 18 on the multiple spring ring 12 engage corresponding detents 24 on the inner ring 14. The torque limit of the torque limiter 10 may thus be set as desired by providing the inner ring with more or fewer detents 24 which may be engaged by spring members 18 on the multiple spring ring 12. As seen in FIG. 1B, the detents 24 have a generally asymmetrical V-shaped profile formed by a stop surface 28 and a cam surface 26. The cam surfaces 26 are located to face leading cam surfaces 22A of the spring members 18 when the spring members 18 engage the detents. The cam surface 26 face in the direction of rotation of the rotatable inner and outer parts A, B as indicated by arrow C in FIG. 1B. Stop surfaces 28 of the detents 24 are positioned to abut the bottom surfaces 22B of the spring members 18 located in the detents. The stop surface 28 of each detent 24 is angled to complement the bottom surface 22B of the spring members 18. The cam surface 26 of each detent 24 has an angle suited for cooperating with the leading cam surface 22A of the corresponding spring member 18 to deflect the spring 18. The depth of the detents 24 may be as desired in order to increase or decrease the deflection of the spring members 18 before the springs disengage the detents 24. The inner bore of the inner ring 14 has keys 32 projecting therefrom. Referring still to FIG. 1, the torque limiter 10 is readily assembled by fitting the inner ring 14 inside the multiple spring ring 12 so that the spring members 18 engage corresponding detents 24 on the inner ring.

In accordance with the first preferred embodiment of the present invention, the torque limiter 10 may be used to connect (in this case) drive gear B to a rotary driven shaft A substantially as shown in FIG. 1. The torque controller 10 may be inserted into the inner bore of the gear B. One or more torque controllers 10 may be used, stacked side-by-side (not shown) inside the gear bore. Suitable needle bearings or bushings (such as oil impregnated bushings) may be used to centralize the torque controllers 10 inside the gear. Keys 30 on the multiple spring ring 12 matingly engage keyways in the gear B thereby connecting the torque controllers 10 to the gear B. Snap rings (not shown) may be used to hold the torque controllers 10 and bearings axially within the gear. With the torque controllers positioned inside, the gear B may then be mounted onto the drive shaft A. Keys 32 of the inner ring 14 of the torque limiter 10 matingly engage the shaft to connect the torque limiter 10 in gear B assembly to the shaft A. Torque from the shaft A may then be transferred to the gear B through the inner and multiple spring rings 14, 12 of the torque limiter. As the shaft A starts turning, indicated by arrow C in FIG. 1, thereby turning the inner ring or ratchet 14, the leading cam surfaces 22A of the corresponding spring members 18 engaged in their respective detents 24 cam against the cam surfaces 26 (see also FIGS. 1A and 1B). The camming action between the detent surfaces 26 and the leading cam surfaces 22A of the mating spring members 18, causes the spring members 18 to deflect. At low torques, there is little deflection induced in the spring members 18 and the spring members remain engaged in the corresponding detents 24 on the inner ring 14. As torque increases, the deflection in the spring members 18 also increases. Larger deflections of the spring members 18 results in the tips 20 of the spring members 18 being displaced from the corresponding detents 24, until the deflection is sufficient so that the tip 20 of each spring member 18 becomes disengaged from the mating detent 24. The torque generating sufficient deflection of the spring members 18 to disengage the spring members of the multiple spring ring 12 from the detents 24 of the inner ring 14 is the torque limit of the torque controller or limiter 10.

When torques at or above this limit are applied, the multiple spring ring 12 slips relative to the inner ring 14. The tips 20 of the spring members 18 disengaged from a first set of corresponding detents 24 resile to engage the immediately subsequent set of detents 24, thereby continuing to transmit torque between the multiple spring ring 12 and the inner ring 14, and hence, between the gear B and shaft A. If the applied torque remains above the torque limit of the torque limiter 10, the springs 18 are deflected again to disengage from the second set of detents and then immediately re-engage the following set of detents. This process is repeated until the torque applied across the torque limiter is below the torque limit. The torque limiter 10 operates to limit torque transfer in one direction only (see FIG. 1). When the shaft A turns in the direction counter to the incline of the spring members 18 (i.e. opposite to the direction of arrow C in FIG. 1), the stop surfaces 28 of detents 24 abut against the bottoms 22B of the spring members. In this case, the spring members 18 are merely compressed axially and have negligible deflection due to high axial stiffness.

Figure 2:
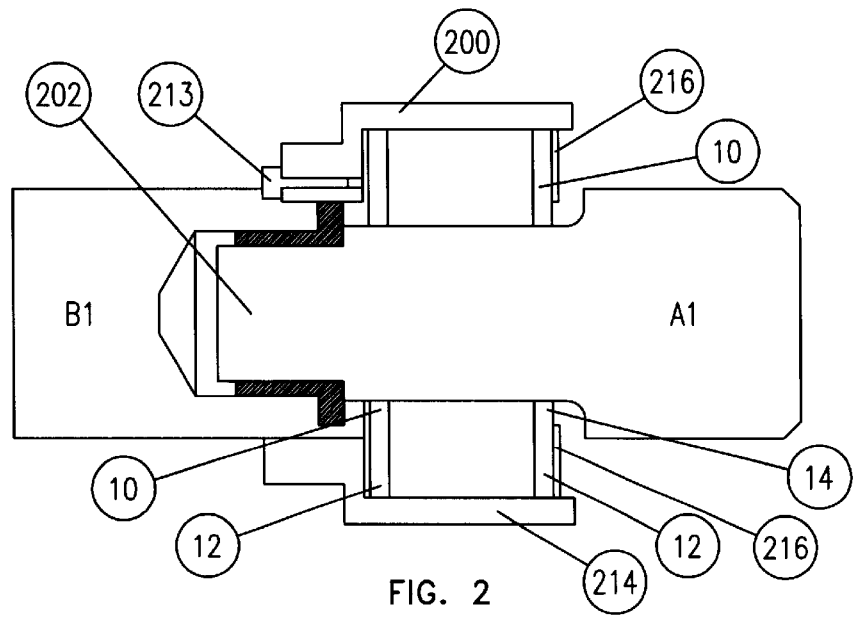
FIG. 2 is a longitudinal cross-sectional view of a coupling for connecting two shafts incorporating the torque limiter of FIG. 1 in accordance with a second preferred embodiment of the present invention.

Referring now to FIG. 2, it is in accordance with the scope of the present invention to use the torque limiter 10 to couple a first drive shaft A1 to a transfer shaft B1. The first shaft may be provided with a male end 202. One or more torque limiters 10 may be mounted inside a coupling 200, in a manner similar to that described previously with reference to FIG. 1. The torque limiters may be held inside the coupling using bearings or bushings 214, and snap rings 216. The coupling 200 may be keyed with keys 213 to the transfer shaft B1. The male end 202 of the drive shaft A1 is mated to the inner ring 14 of the torque limiters 10 mounted in the coupling 200. Torque from the drive shaft A1 is thus transferred through the torque limiters 10 to the coupling 200 and then to the transfer shaft B1 in a manner similar to that described previously with reference to FIG. 1.

Figure 4:
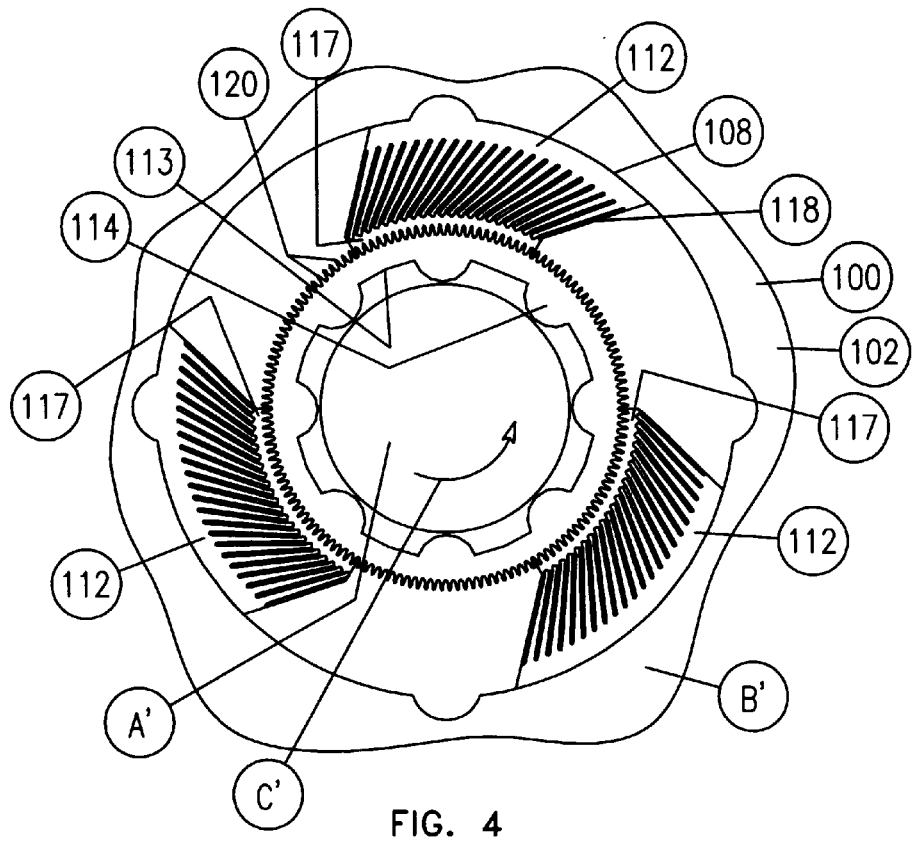
FIG. 4 is a partial end view of the torque controller in FIG. 3.

Referring now to FIGS. 3, 4, 4A–4F there is shown a full function torque controller 100 incorporating features of the present invention in accordance with a third preferred embodiment, and inner and outer rotatable parts A', B'. The controller 100 is coupling the inner and outer rotatable parts. The rotatable parts A', B' are generally concentric so that they rotate about a common axis X'. One part A' is preferably a driving part such as a drive shaft, and the other part B' is a driven part such as a wheel, pulley, gear, or drive shaft. FIG. 4 is an elevation view which shows, for example purposes, the controller 100 used to couple a drive shaft A' powered by a motor D', to a driven gear B' (similar to gear B in FIG. 1). The torque controller 100 generally comprises a housing 102 which is mounted to the gear B', and which holds an inner ring or ratchet 114 mounted on the drive shaft A'. Thus the torque controller 100 interfaces between the rotatable shaft A', and gear B', and torque provided by the drive shaft A' is transferred to the driven gear B' through the controller 100. In this preferred embodiment, the controller further comprises an outer slip ring assembly 108, a cam assembly 104, an actuating assembly 106, a stepper motor 107, and a controller 105. The outerslip ring assembly 108 is mounted to the housing 102 to rotate with the housing and thereby rotate the gear B'. The outer slip ring assembly 108 interfaces between the housing 102 and the ratchet 114. The outer slip ring assembly 108 transfers torque from the ratchet 114 to the housing 102. The cam assembly 104 and actuating assembly 106 connect the stepper motor 107 to the outer slip ring assembly 108. The controller 105 is connected to the stepper motor to control operation of the stepper motor 107. Similar to the outer ring 12 in torque limiter 10, described previously and shown in FIGS. 1, 1A–1B, the outer slip ring assembly 108 has a spring loaded contact surface with teeth which engage the inner ring 114 to transfer torque from the ratchet or inner ring to the outer ring assembly. When the torque across the controller 100 exceeds the predetermined amount, the teeth on the outer ring assembly 108 disengage from the ratchet 114, thereby allowing outer ring and ratchet to slip relative to each other. The teeth automatically reengage the inner ring 114.

As seen best in FIG. 4, the ratchet 114 is substantially similar to the inner ring 14 of the embodiment shown in FIG. 1 and described previously with similar features having similar numbers. The ratchet 114 has an inner bore 113 for mating to shaft A'. The outer surface 140 of the ratchet 114 has detents 124. The detents 124 are equally distributed around the circumference of the ratchet. In the preferred embodiment, the ratchet 114 has 128 detents 124. The detents may have a generally asymmetrical V-shaped profile (similar to that shown in FIG. 1B) formed by a stop surface and a cam surface. The cam surface of each detent faces in the primary direction of rotation indicated by arrow C' (see FIG. 4). The ratchet may be provided with splines or key members for fixedly connecting the ratchet 114 to the shaft A' though the ratchet may be fixed to the mating shaft by any other suitable means.

Figure 4C:
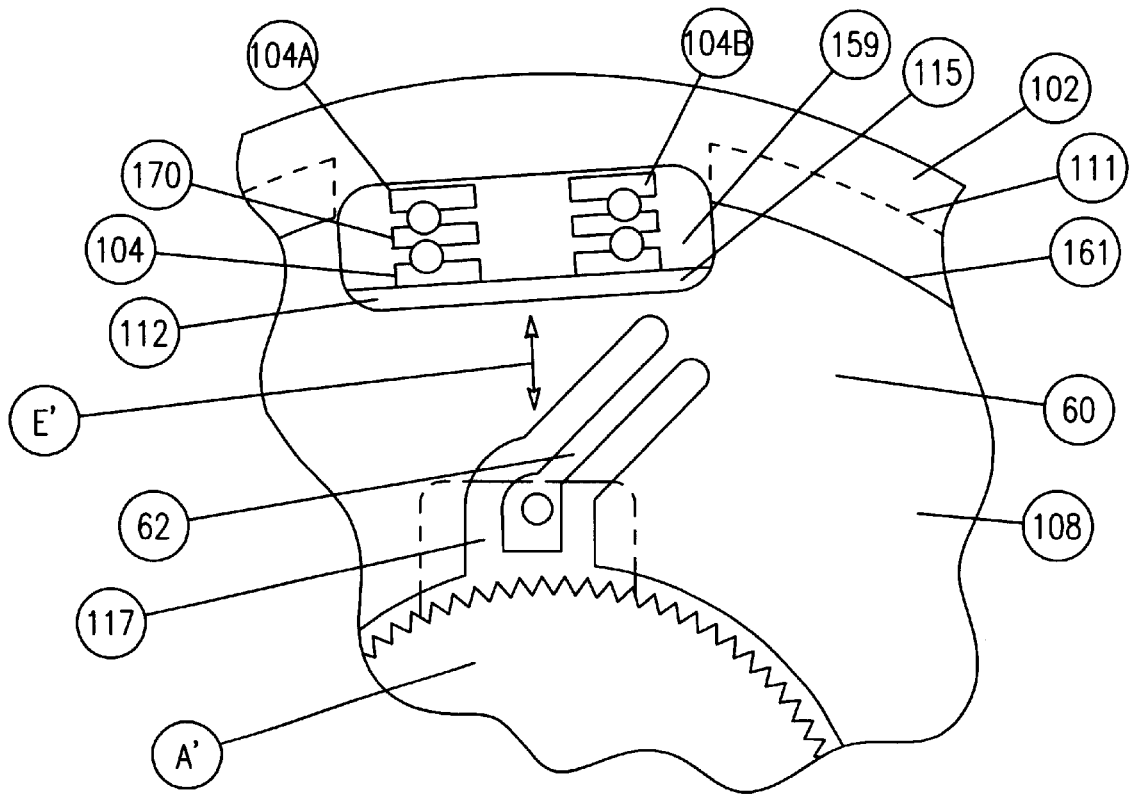
FIGS. 4C–4D respectively are an end view of an outer ring assembly and ratchet of the torque controller in FIG. 3, and an end view of a linear actuating assembly of the torque controller in FIG. 3.
Figure 4A:
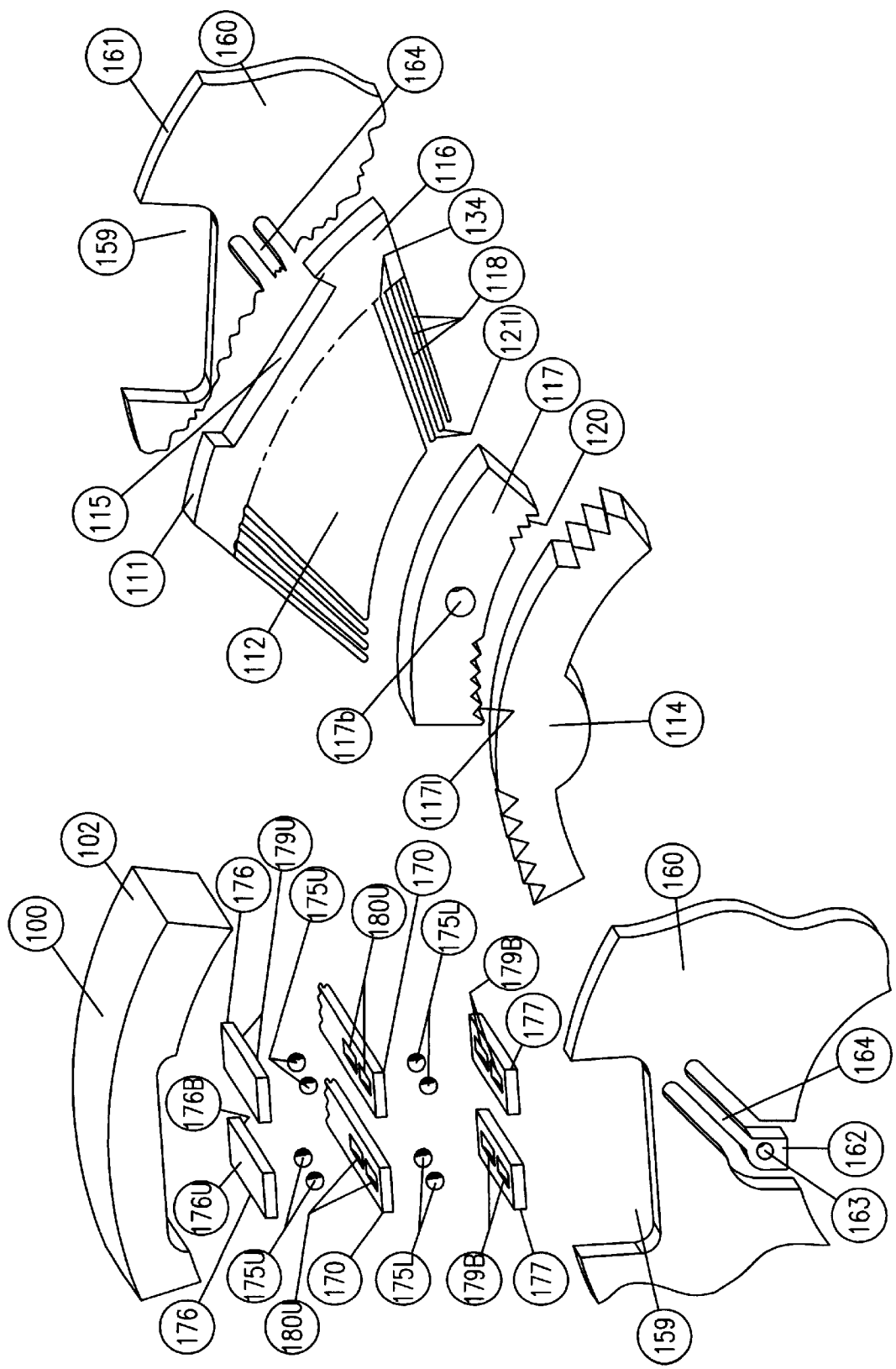
FIGS. 4A–4B respectively are a partial exploded view, and a partial cross-sectional view taken from an axis of symmetry of the torque controller in FIG. 3.

Still referring to FIGS. 4, 4A–4C, the outer slip ring assembly 108 comprises two support or cover plates 160, a number of multiple spring members 112, and a number of slip pads or shoes 117, as can be realized from FIG. 4A, the slip shoes 117 and multiple spring members 112 are sandwiched between the two cover plates 160. FIG. 4 shows three slip shoes 117 and three multiple spring members 112 for example purposes, though the outer slip ring assembly may comprise any suitable number of slip shoes and multiple spring members. Each slip shoe 117 is mounted to the inner edge of the cover plates 160. Each slip shoe 117 has a multiple spring member 112 seated on top of the shoe 117. As can be seen in FIG. 4, the slip shoes 117 are disposed equally around the circumference of the outer ring assembly 108.

Figure 4B:
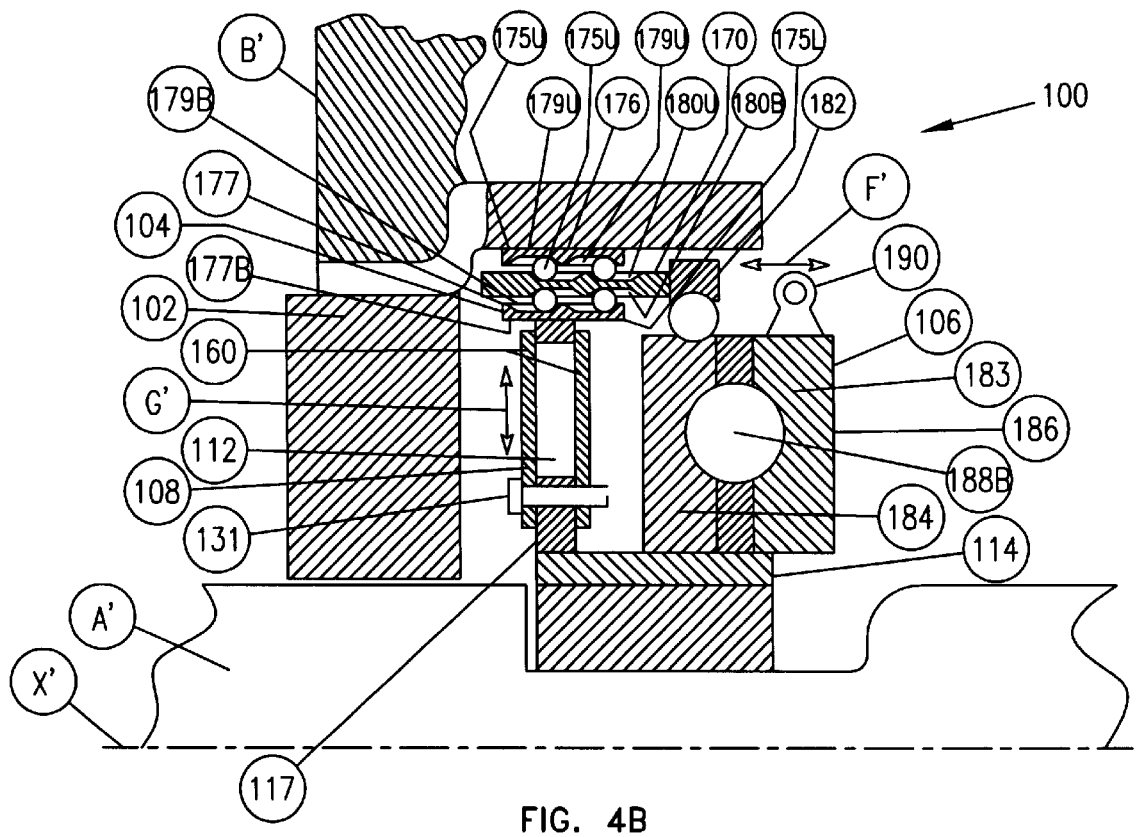
Figure 4D:
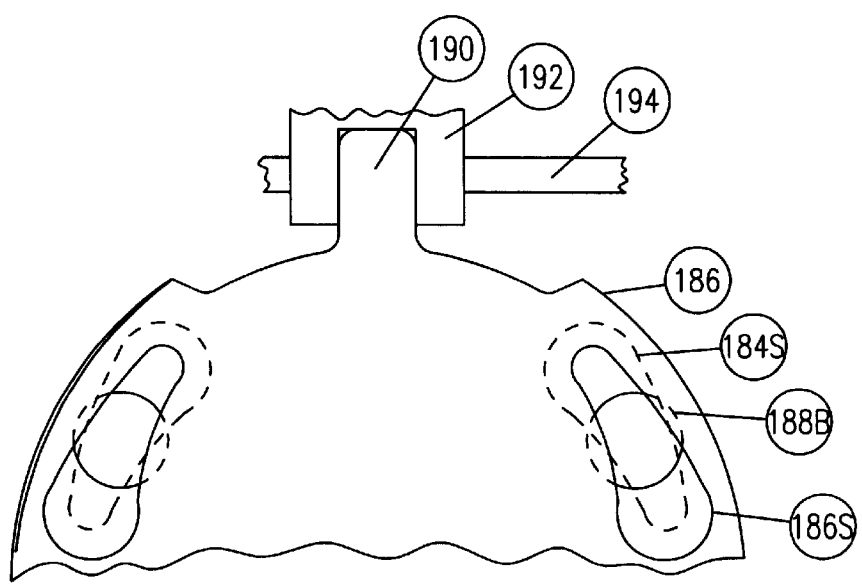

In the preferred embodiment, the shoes 117 in the outer ring assembly 108 are substantially the same. Each shoe 117 is preferably a one-piece member made from a suitable material such as 7075 T6 Al. The shoe 117 has a lower contact surface 117I (see FIG. 4A). The contact surface has a number of cam shaped teeth 120 formed therein. The cam shaped teeth 120 on the slip shoe 117 are formed in conformal opposed relation to the detents 124 of the ratchet 114 so that the teeth 120 on the slip shoe 17 may mate an equal number of detents 124 on the ratchet 114 as shown in FIG. 4B. The length of the shoe may be as desired in order to provide a suitable number of teeth. The shoe 117 has a bore 117b therein for fastening the shoe 117 to the cover plates.

The multiple spring members 112 of the outer slip ring assembly 108 are substantially the same, and will be described below with reference only to one of the spring members 112. The multiple spring member 112 is similar at least in part, to the outer ring 12 of the torque controller 10 described previously and shown in FIGS. 1, 1A–1B. Accordingly, similar parts of the multiple spring member 112 and outer ring 12 have similar reference numbers. The multiple spring member 112 is preferably a one piece member made of suitable metal. The multiple spring member 112 has an outer base section 116 akin to the hoop section 16 of the outer ring 12. Cantilevered spring fingers 118 project radially inwards from the bases section 116. As shown in FIGS. 4, 4A the spring fingers 118 are radially raked so that the root 134 is offset in the direction of rotation (indicated by arrow C') relative to the tips 121 of the spring fingers. Each spring finger 118 is tapered longitudinally and, may be curved to have a generally parabolic shape along its length. In alternative embodiments, the spring fingers may have any other suitable shape. The spring fingers may be spaced in the preferred embodiment at a pitch of about 0.05 rads/tooth. This provides one spring finger 118 for each tooth 120 on the shoe 117. In this fashion each beam 118 does a calculable amount of work as it is deflected when the shoe rides up and over the detents 124 of ratchet 114. This work is multiplied by the number of beams 118 available in a given multiple spring member, and by the number of multiple spring members in the outer ring 108. Because the detents 124 are arranged in a circular fashion, it makes the action between shoes 117 and ratchet 114 endless. By having many small ratchet teeth 120 and detents 124, more work over a shorter displacement distance occurs. This allows full activation and release of the load in only about 16 thousandths of an inch of travel. The base section 116 of the multiple spring section has an outer seating surface 111 with a relief 115 formed therein.

In the preferred embodiment, the cover plates 160 of the outer slip ring assembly 108 are substantially the same and will be described below in detail with particular reference to only one of the cover plates. Cover plate 160 is preferably a one-piece member, cut or formed from a suitable sheet metal or plastic sheet. The cover plate 160 has a general ring shape surrounding the ratchet 114. The cover plate 160 has an outer seating surface 161 for seating the cover plate against the housing 102 when the outer ring assembly 108 is mounted to the housing. The outer seating surface has a relief 159 formed therein. The outer seating surface 161 may have a number of radial splines (not shown) for securing the cover plate to the housing as will be described in greater detail below. The cover plates 160 have a clevis feature 162 which allows each shoe 117, around the circumference of ratchet 114, to be fastened to the cover plates. Each shoe 117 is fastened by a pin/bolt inserted through the hole 163 in the clevis 162 and in the shoe 117. Each cover plate 160 has an inclined flexible cantilever member 164 which in combination with the member 164 of the opposite plate 160 forms the clevis 162. The flexible cantilever 164 is inclined in the same direction as the spring fingers 118 of the multiple spring member 112. The angle of inclination is preferably substantially similar to that of the spring fingers 118. In alternate embodiments, the clevis feature for holding to slip shoes between the cover plates may be formed by any other suitable means. The outer edge of the cover plate 160 may be movably connected by suitable means such as for example radial splines (not shown) to the base section 116 of the 15 multiple spring member 112. The multiple spring members 112 are thus capable of moving radially, (the direction indicated by arrow G' in FIG. 4B) between the cover plates 160 as will be described below. The cover plates are preferably secured to the housing 102 of the torque controller 100 so that the cover plates 160 rotate together with the housing 102. For example, the outer seating surface 161 of the cover plates 160 may be fastened, splined, or keyed to the housing 102, so that, the cover plates rotate with the housing 102 as a unit (about axis of symmetry X'). Accordingly, the cover plates 160, and hence the shoes 117 and multiple spring members 112 biased against the shoes are prevented from rotating with the ratchet 114 relative to the housing 102.

As noted previously, and seen best in FIG. 4B, the outer slip ring assembly 108 is assembled in general by placing the slip shoes 117 and corresponding multiple spring members 112 between the cover plates 160. The slip shoes 117 may then be fastened with the pin/bolt 131 to the corresponding clevis feature 162 of the cover plates 160. Each shoe 117 has a multiple spring member 112 seated on top of the shoe with the tips 121 of the spring fingers 118 resting on the shoe (see FIG. 4, the outer ring 108 is shown in FIG. 4 without cover plate 160 for simplicity). The outer slip ring assembly 108 may then be secured to the housing 102. In this configuration, the slip shoes 117 contact the ratchet 114 with the teeth 120 on the shoes engaging the detents 124 of the ratchet. The multiple spring members 112 bias each slip shoe 117 against the ratchet 114. The flexible clevis 162 allows the shoes 117 of the outer ring assembly 108 to resiliently move radially as indicated by arrow E' in FIG. 4C. Thus, when a torque is transferred across the ratchet 114 to shoes 117, the shoes 117 are thrust radially outwards (in the direction indicated by arrow E') against the spring fingers 118 of the multiple spring member 112. Radial motion of the shoes 117 is controlled by the flexibility of the spring fingers 118. As the torque is increased, the shoes continue to deflect the springs 118 until at the torque limit, the deflection of the springs 118 is sufficient to allow shoes 117 to disengage the ratchet 114 as described previously.

The cam assembly 104 of the controller 100 may be used to adjust the torque limit of the controller by changing the spring bias or preload of the multiple spring members 112 against the corresponding slip shoes 117. The cam assembly 104 generally comprises a linear actuator 170 with a cam surface 174 thereon. The linear actuator 170 which is biased on one side against the housing 102 and when moved in or out as indicated by arrow F' in FIG. 4B, cams the multiple spring member radially relative to the slip shoes 117 seated on the ratchet 114. In greater detail as can be seen in FIGS. 4A–4C, cam assembly 104 may preferably include two substantially similar assemblies 104A, 104B which may be separated by a spacer block (not shown). Each assembly comprises an actuator or push rod 170, an upper support plate 176, a lower support plate 177 and bearings 175U, 175L. In alternate embodiments, the cam assembly may have any other suitable configuration for camming the multiple spring members relative to the slip shoes of the outer slip ring. The upper and lower support plates 176, 177 are substantially similar but mirror images of each other. One surface 176U, 177B is substantially flat and the other surface 176B, 177U of the support plates has a pair of grooves 179U, 179B for bearings 175U, 175L. As can be seen in FIG. 4B, the grooves 179U, 179B are cammed such that one end is shallower than the other. The push rod 170 also has matching bearing grooves 180U, 180B in its upper and lower surfaces. As shown in FIG. 4C, the cam assembly 104 is located within the relief 115, 159 in the multiple spring member 112 and cover plates 160 of each outer ring assembly 108. Accordingly, there are preferably three cam assemblies 104, (only one being shown for example purposes) each for camming a corresponding multiple spring member 112 of the outer ring assembly. The upper support plates 176 are seated with upper surface 176U against the housing 102 (see FIGS. 4B–4C). The lower support plates 177 are seated with surface 177B respectively against the seating surfaces of the multiple spring member 112 (see FIG. 4B–4C). The support plates may be staked or keyed in place. The push rods 170 are held between bearings 175U, 175L which are respectively seated in the grooves of the upper and lower support plates. As can be realized from FIG. 4B, the bearing grooves 179U, 179B in the seating plates 176, 177 have a cammed or ramped configuration. The opposing bearing grooves 180U, 180B in the push rod 170 are also cammed or ramped in reversed relation to the facing grooves 179U, 179B of the seating plates 176, 177. Accordingly, when the push rod 170 is moved axially in the direction indicated by arrow F', the bearings 175U, 175L move in the cammed grooves causing the lower support plate 177 to move radially relative to the housing 102, and cover plates 160, in the direction indicated by arrow G' (see FIG. 4B). The lower support plate 177 bears against the multiple spring member 112, and hence, under the camming action moves the multiple spring member 112 radially relative to the slip shoe 117. As the multiple spring member 112 is moved radially inward, the spring fingers 118 are compressed together increasing the spring preload on the slip shoe 117. When the multiple spring member 112 is allowed to resile outwards, for example, by moving the push rod 170 to the right in FIG. 4B, the spring bias on the slip shoe 117 is reduced. The camming grooves 179U, 179B, 180U, 180B, have a sufficient depth to allow the lower support plate 177 to cam the multiple spring member 112 radially between a condition where the spring fingers 118 are fully compressed against the slip shoe 117 and a condition where there is substantially no spring bias against the shoe. By varying the spring bias of the multiple spring member 112 against the slip shoe 117, the force for causing the teeth 120 on the shoe 117 to disengage the detents 124 on the ratchet is varied thereby changing the torque limit of the torque controller 100. Moreover, controller 100 is fully capable of having the torque limit set on the fly as will be described in greater detail below.

Figure 4E:
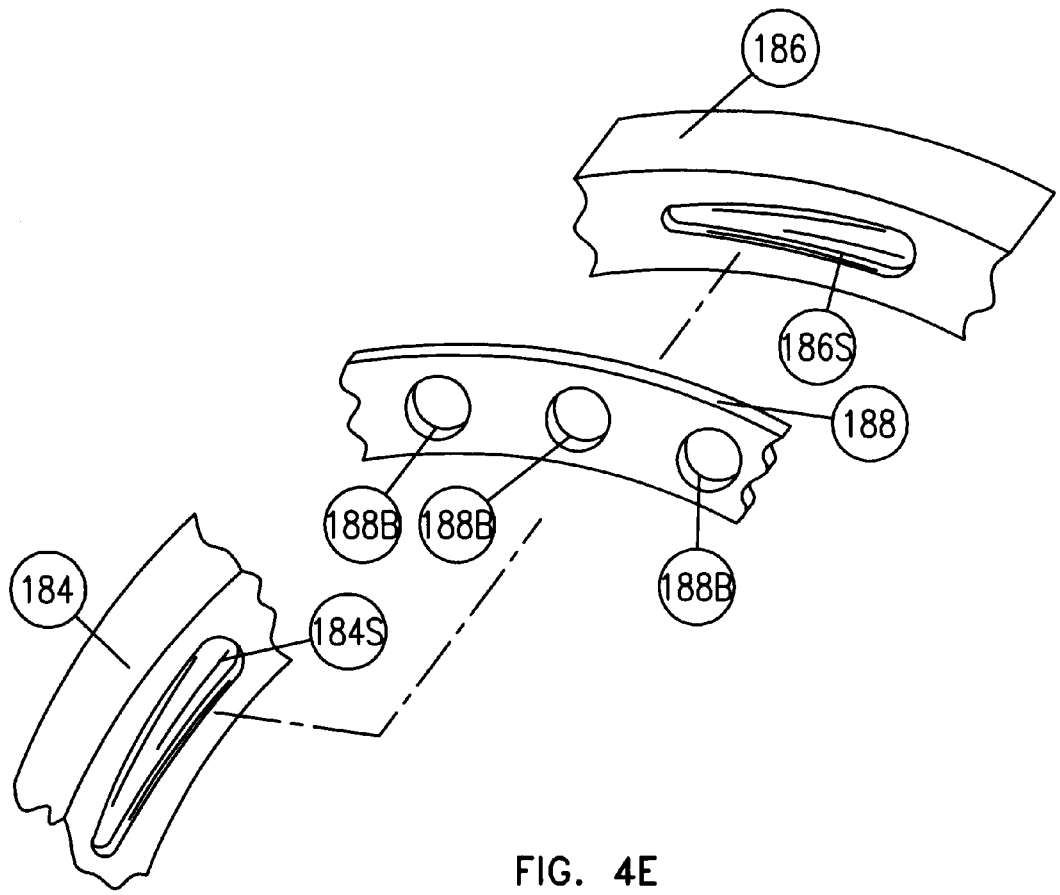
FIGS. 4E–4F respectively are a schematic partial exploded view of a telescoping bearing, and a partial cross-sectional view of the actuating assembly in FIG. 4D.
Figure 4F:
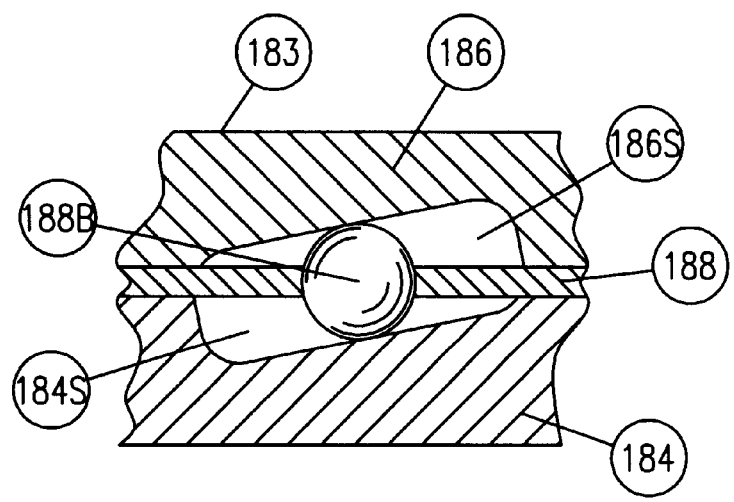

As can be seen in FIG. 4B, the end of the push rod 170 is connected to the linear actuating assembly 106. The linear actuating assembly 106 generally comprises an outer bearing sleeve 182 and a telescoping bearing assembly 183. The outer bearing sleeve 182 to which push rod 170 is connected is supported by ball bearings, or any other suitable means from the telescoping bearing assembly 183. The outer bearing sleeve 182 hence allows the cam assembly 104 to rotate freely, with the outer ring assembly 108 of the controller 100, relative to the bearing assembly 183. The telescoping bearing assembly 183 generally comprises a front race 184, a rear race 186 and a bearing ring 188. Referring also to FIGS. 4E–4F which respectively show an exploded perspective view and a partial elevation view of the telescoping bearing assembly, the bearing ring 188 holds a number of ball bearings 188B therein. The front and rear races 184, 186 have opposing cam slots 184S, 186S formed therein. When the telescoping bearing assembly 183 is assembled, the ball bearings 188B are located in the cam slots 184S, 186S of the front and rear races (see FIGS. 4E–4F). The cam slots 184S, 186S in the front and rear races are configured such that when the rear race 186 is rotated about axis X' (see FIG. 4B), the rotation of the rear race causes the front race 184 to move axially in and out in the direction indicated by arrow F'. This in turn causes the outer race 182 which is supported by the front race 184 to move pushrod 170 of the cam assembly 104. The telescoping bearing assembly may be supported by a suitable bushing or bearing (not shown) from the rotatable part A'. The rear bearing race 186 has an eyed member 190 projecting therefrom which is mated to a threaded clevis 192 for attaching the rear race 186 to the stepper motor lead screw 194. Operation of the stepper motor 107 turns the lead screw 194, which in turn moves the clevis 192 along the screw thereby rotating the rear race 186 about axis of symmetry X'. The axial slope of the cam slots 184S, 186S in the front and rear races is such as to generate sufficient force to move the pushrod 170 in the cam assembly 104, in the direction indicated by arrow F' (see FIG. 4B), and thus to preload the multiple spring members 118 of the outer ring assembly 108 to the fully compressed condition using the low torque of the stepper motor 107. The stepper motor 107 is controllably connected to the controller 105, which operates the motor 107 to change the torque limit of torque controller 100 as desired. In alternate embodiments, the stepper motor lead screw may be connected to a dial control to allow manual adjustment of the torque limit without using the stepper motor. Preferably, the controller 105 is a programmable controller.

The torque controller 100 may include appropriate sensors (not shown) to indicate to controller 105 when the outer ring assembly 108 is slipping over ratchet 114 or not. Thus, the torque controller 100 may be programmed using programmable controller 105 to respond to external conditions or to different loads at different times, and to signal its status. When an overload occurs, the torque controller 100 can be set to instantly drop its load, or maintain the set torque at AC motor speeds. An E-Stop pressed at a remote location will almost immediately separate the load from the driving force. The programmable controller 105 may be connected via a suitable data communication system (e.g. the Internet, or a LAN) to a suitable computer (not shown) at a remote station, thereby allowing an operator to remotely control the settings of torque controller 100. Using the remote station the operator may change torque controller 100 settings form zero in a continuous smooth ramp-up to its maximum designed torque transmission or vice versa. Overload torque can be set closer to the running torque thereby providing more sensitive overload detection and a safer mode of operation. In alternate embodiments, the torque controller can be substantially infinitely varied manually at the device with a knob, or at a reasonable distance from the device through a flexible shaft cable. The knob or cable is introduced at the same spot the stepping motor would plug in.

Figure 5B:
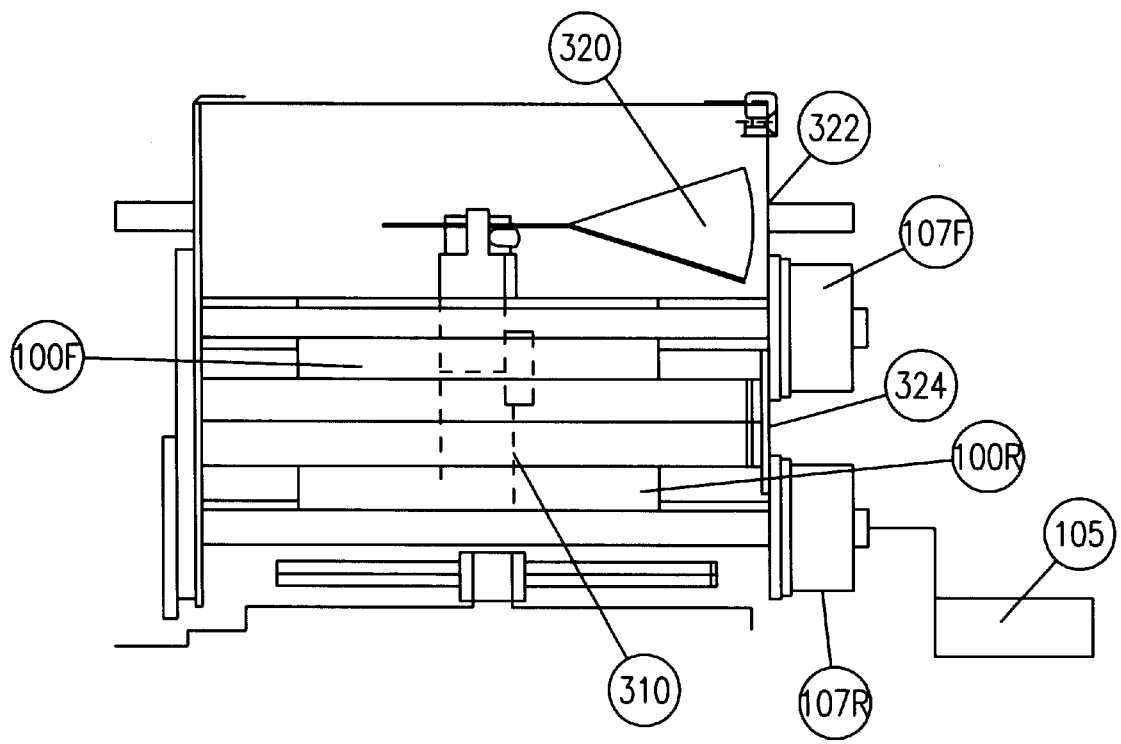
FIGS. 5A–5C respectively are a front elevation view, a top plane view, and a partial cross-sectional view of two opposing torque controllers mounted on a motor shaft in a torque absorber arrangement in accordance with a fourth preferred embodiment of the present invention.
Figure 5A:
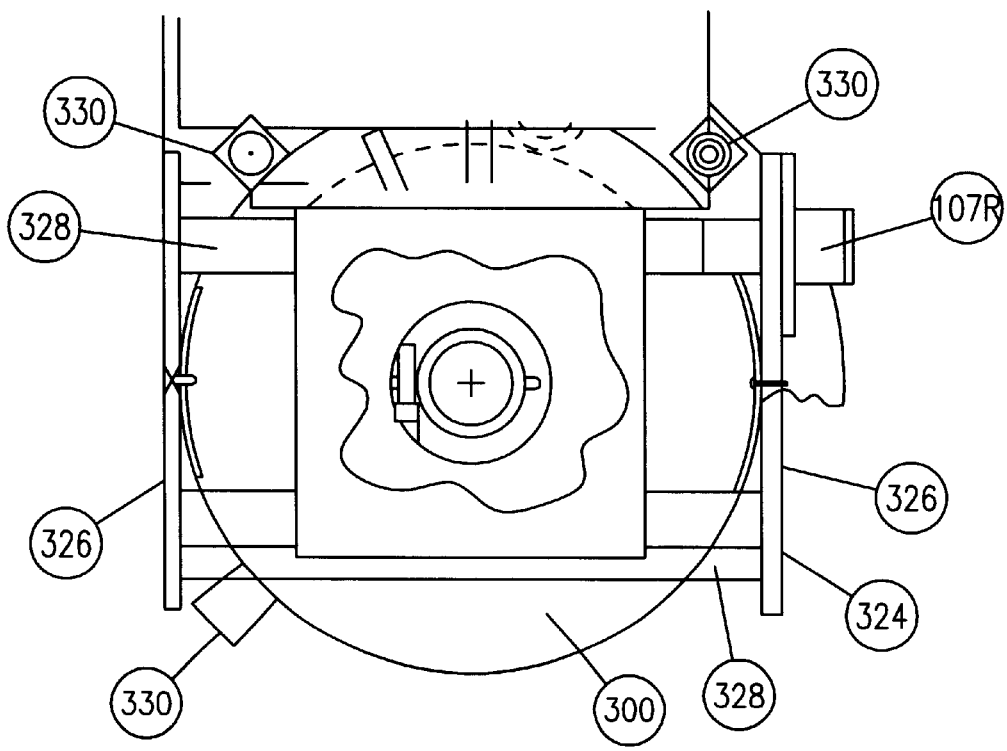
Figure 5C:
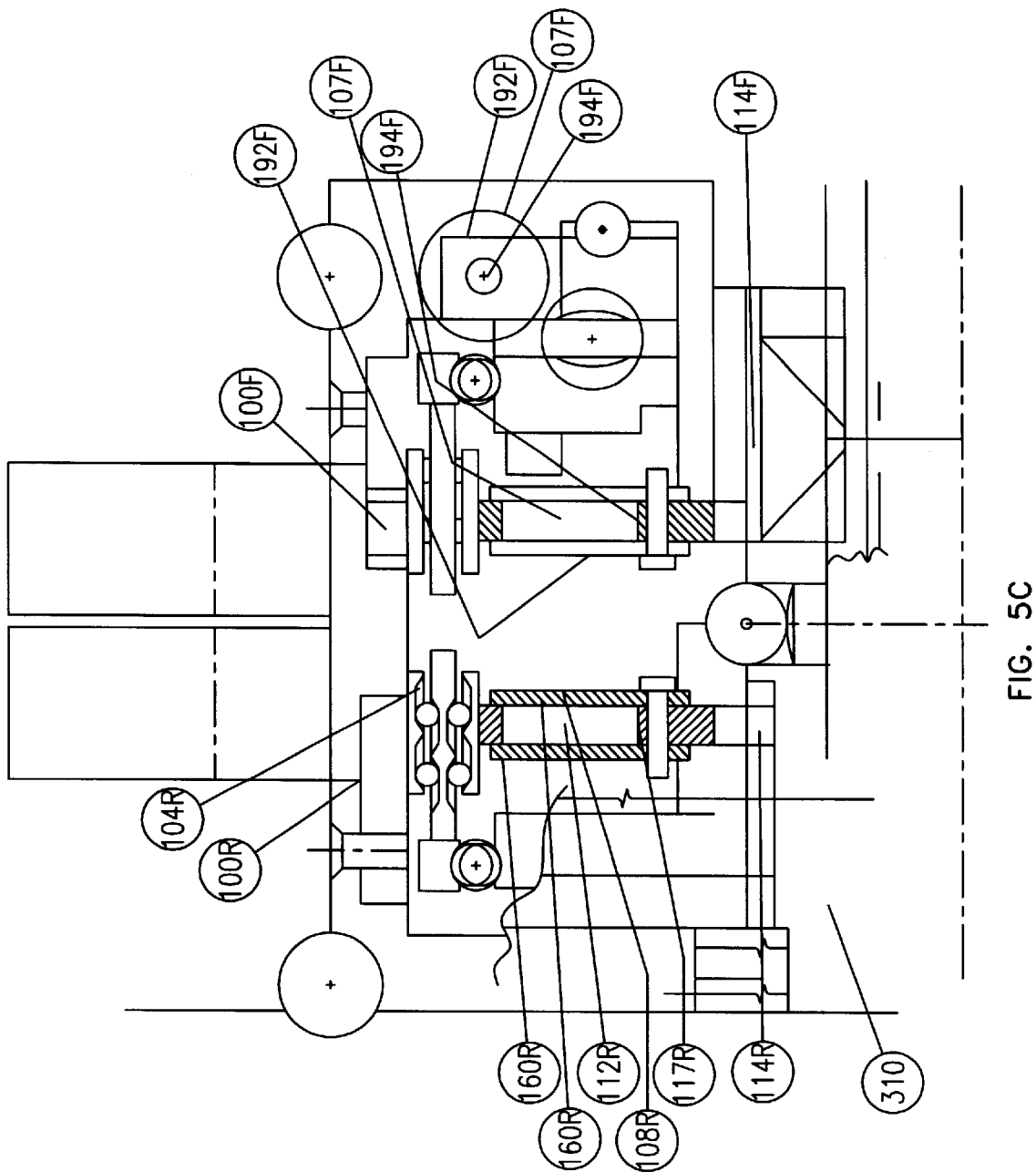

Referring now to FIGS. 5A–5C, there is shown another preferred embodiment of the present invention. In this embodiment, two full function torque controllers 100F, 100R are mounted on an output shaft 310 of motor 300. The output shaft 310 is ultimately coupled to a fan 320 surrounded by shroud 322. The torque controllers 100F, 100R are substantially the same as torque controller 100 described previously and shown in FIGS. 3, 4, 4A–4F, and similar parts are similarly numbered. The torque controllers 100F, 100R are held on the shaft 310 by support frame 324 which may be bolted to the motor housing or base. The torque controllers 100F, 100R are mounted in opposing relation to each other such that one controller may work against the other controller. The support frame may comprise a pair of side plates 326 connected by transverse support bases 328. The torque controllers 100F, 100R may be fastened to side plates 326 or otherwise held from spinning freely with the output shaft 310 by stop blocks 330. In this embodiment, the torque controllers 100F, 100R need not be connected to transfer torque from the motor shaft 310 to another motive component. In this case, the torque controllers 100F, 100R may operate as a torque absorber or torque brake on shaft 310. Torque controller 100F operates as an input torque controller (i.e. the controller 100F is connected to a driven section which is allowed to rotate), and torque controller 100R is an output section (i.e. the controller 100R is connected to a fixed section prevented from turning by support frame 324). The above described embodiment is merely one example of the torque controller 100 of the instant invention being used in a torque absorber, and the torque controller of the instant invention may be used equally well in any other suitable clutch, brake, or load absorbing system.

Figure 6:
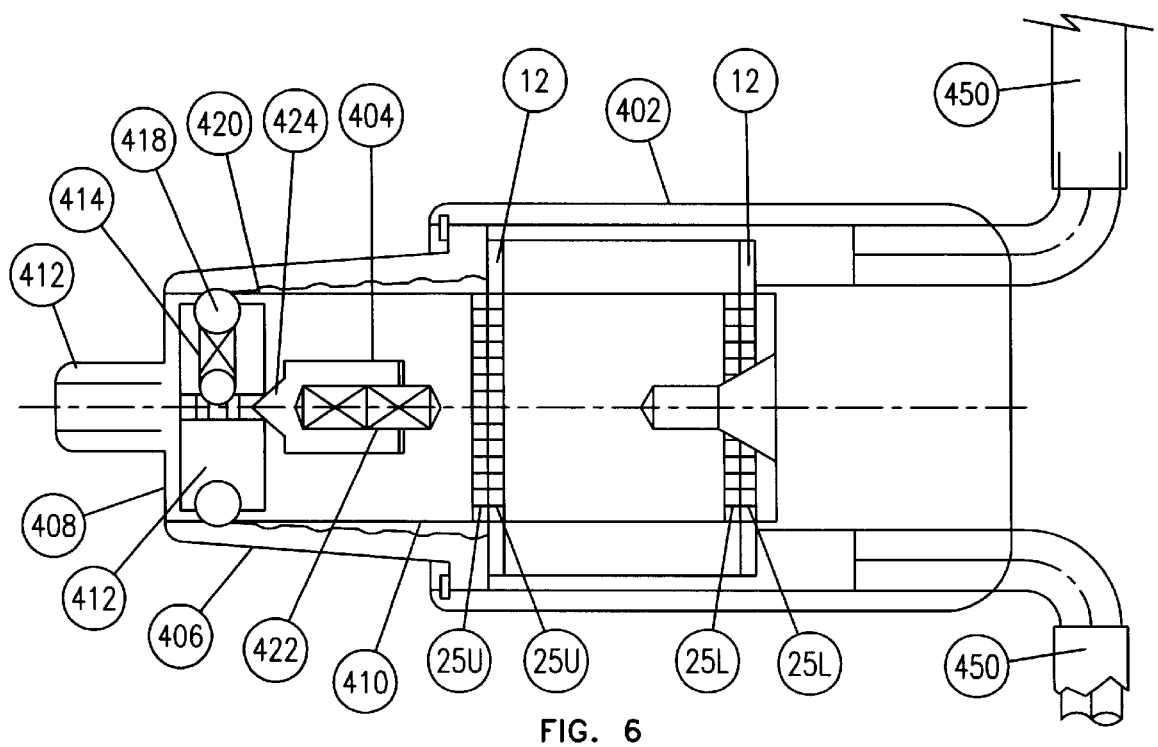
FIG. 6 is a longitudinal cross-sectional view of a torque driver in accordance with a fifth preferred embodiment of the present invention.
Figure 3:
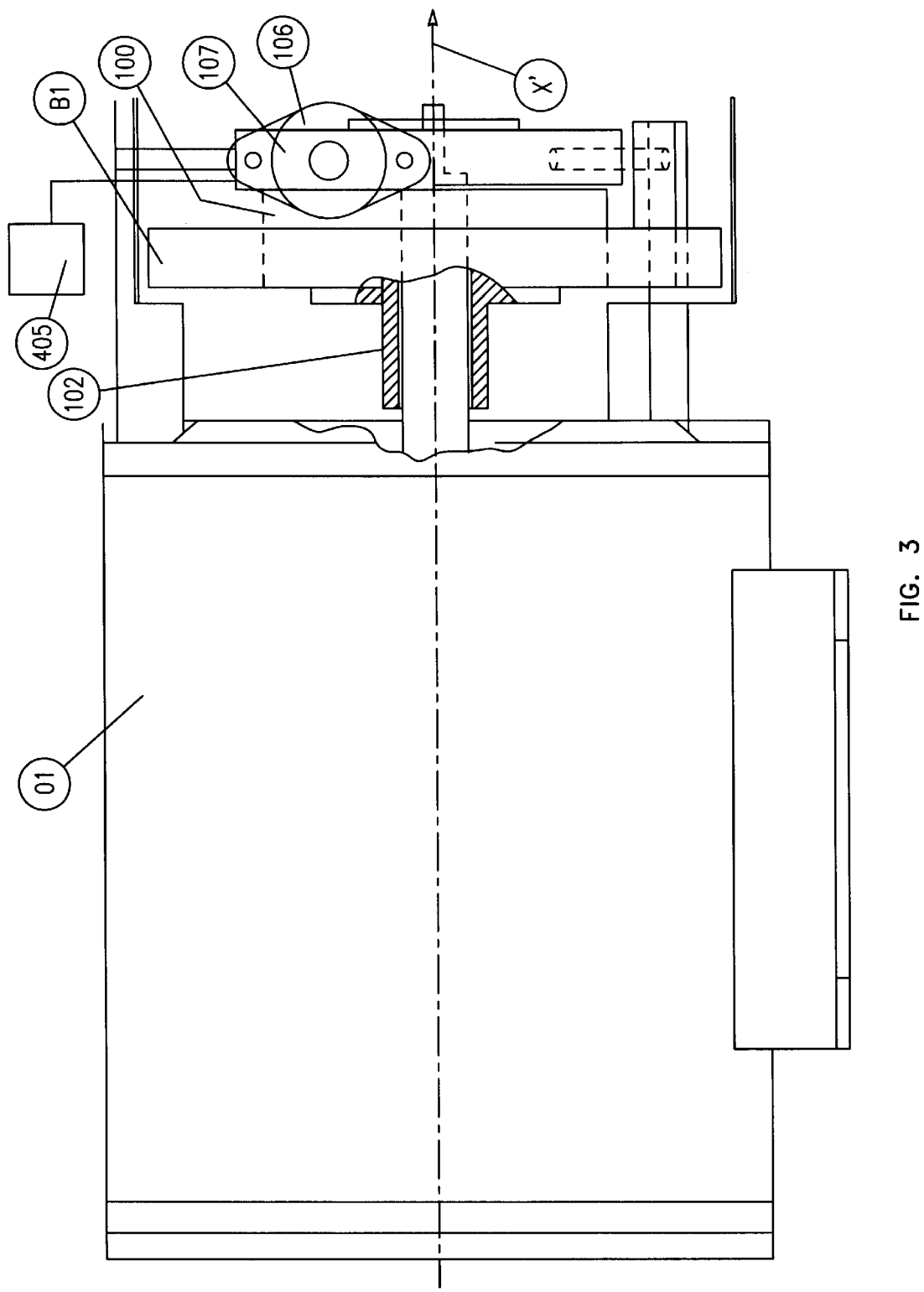
FIG. 3 is an elevation view of fully adjustable torque controller in accordance with a third preferred embodiment of the present invention, the torque controller being mounted on an output shaft of a motor.

Referring now to FIG. 6, it is still within the scope of the present invention to use a torque limiter similar to torque limiter 10 described previously and shown in FIGS. 1–1B in a torque driver 400. The torque driver 400 generally comprises an outer casing 402 from which depends a freely rotatable, internally-grooved chucksetting head 406 which holds a self-adjusting chuck assembly 408. The self-adjusting chuck assembly 408 is connected to a drum 410 which is fluted similarly to surface 40 on rings 14 (see FIG. 1B) to engage one or more of the multiple spring rings 12 (see FIG. 1A) disposed inside the casing 402. The front of the head section 406 has a sleeve 412 with a bore through which a drive key, such as an Allen type key or bit for a socket may be inserted into the self-adjusting chuck 408. The self-adjusting chuck 408 may comprise two diametrically opposing collet members 412, 414 connected by a central member 404 to the drum 410. The central member 404 is disposed generally orthogonally to the collet members 412, 414. Collet members 412, 414 have balls 418 which engage channels 420 in the inner bore of the head section 406. The collet members 412, 414 thus rotate in unison with the head section 406, yet may be displaced axially from channel to channel inside the head section. The central member 404 is spring loaded to bias the member axially relative to the drum 410. The central member 404 may be otherwise engaged to the drum 410 so that the member 404 and drum 410 rotate in unison. The drum 410 is held within one or more multiple spring rings 12 so that it may slide axially relative to the outer casing 402 of the driver 400. The central member 404 is spring loaded by spring 422 to bias the member 404 against the opposed collet members 412, 414 of the self-adjusting chuck 408. The central member 404 has a keyed front end 424 engaging the opposed collet members 412, 414, so that, the collet members and central member turn as a unit. The front end 424 is preferably angled to separate the collet members 412, 414 as the self-adjusting chuck assembly 408 is pressed inwards into the head section 406. Accordingly, when a key of unknown size is inserted through socket 412 into the chuck assembly 408, the user need only press the key inwards until the collet members 412, 414 are displaced sufficiently apart to accept the key in-between. As the chuck 408 is pressed inwards so that the key is admitted by the collet members 412, 414, the drum 410 is moved axially within the outer casing 402. The multiple spring rings 12 which are fixedly mounted to the outer casing 402 thus also slide axially over the drum 410. The drum is provided with rows 25 U, 25 L, of detents which are engaged by spring members 18 of the multiple springs 12. The rows have varying numbers of detents (similar to detents 24 in FIG. 1B), and/or varying outside diameters in order to provide varying torque limits (i.e. more detents for higher torque limits). The detent rows 25 are arranged axially along the drum 410 so that the torque which may be generated by the driver 400 corresponds to the key inserted in the driver. By way of example, if a ¼ inch key is inserted into the chuck assembly 408, the drum 410 is moved axially relative to the multiple spring rings 12 so that the detent rows 25U, 25L aligned with the multiple spring rings 12 allow the driver 400 to develop a torque suitable for use with the ¼ inch key. The torque limiter feature provided by the multiple spring rings 12 and drum 410 prevent the user from using the driver 400 to apply a larger torque than that suitable for the ¼ inch key. The user applies torque on the driver 400 by rotating the removable insertable handles 450 in the outer casing 402. The torque generated from rotating the outer casing 402 is applied across the multiple spring rings 12 to the drum 410 in a similar manner to that described previously with reference to FIG. 1.

Figure 7:
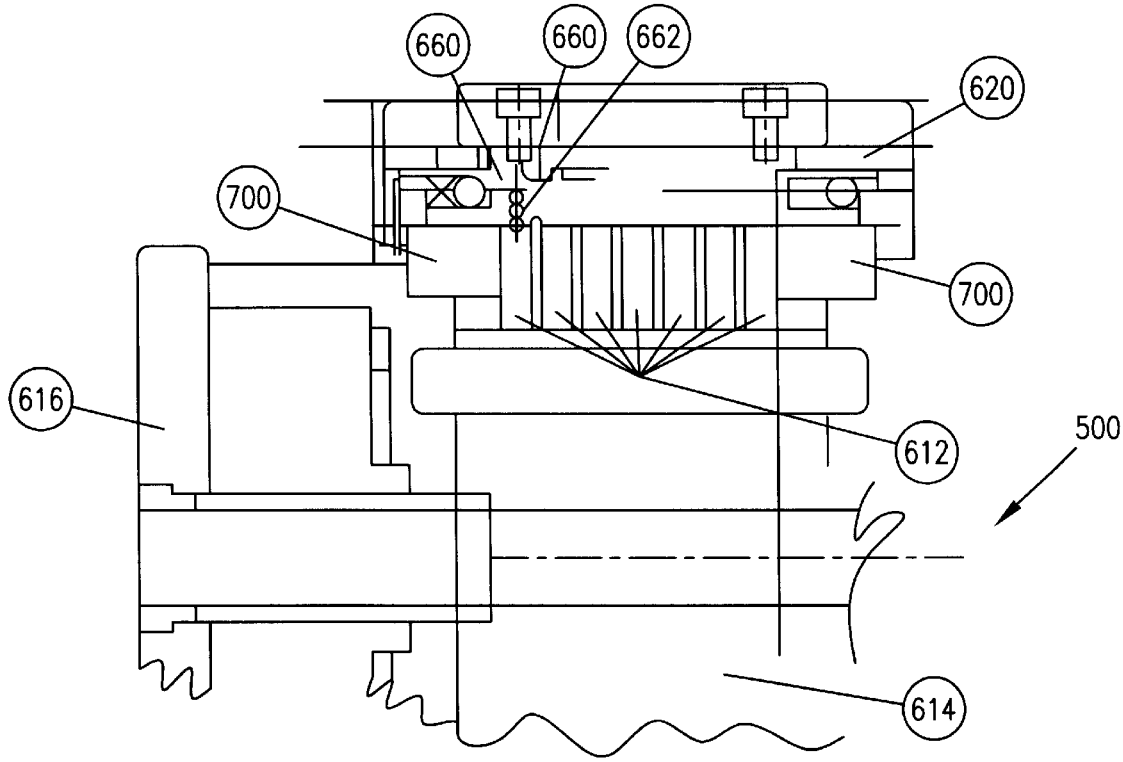
FIG. 7 is a partial longitudinal cross-sectional view of a torque meter in accordance with a sixth preferred embodiment of the present invention.
Figure 7A:
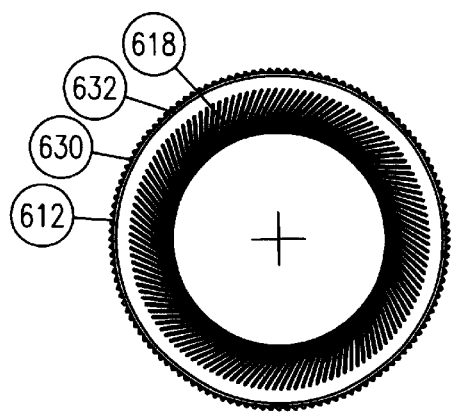
FIG. 7A is an end elevation view of a multiple spring ring the torque meter in FIG. 7.

It is further in accordance with the present invention to use the torque limiter features of the present invention in a torque meter 500 as shown in FIG. 7. The torque meter 500 generally comprises a series of multi spring rings 612, shown in FIG. 7A, disposed on a central cylinder 614 which is provided with matching rows of detents (similar to detents 24 of the inner ring 14 in FIG. 1B) to engage spring members 618 of the multi spring rings 612. The spring members 618 are substantially the same as the spring members 18 of the torque limiter 10 described previously with reference to FIGS. 1, 1A. As previously noted, rings 612 may have varying numbers of spring members 618, acting over varying deflections. In the preferred embodiment, torques progress from ring to ring by a factor of (2). Thus, settings can be made providing integral torques from 1 through 128 using 7 rings. The central cylinder 614 is provided with a front coupling or hub section 616 adapted to be mated to a keyed shaft (not shown). The central cylinder 614 and the multi spring rings 612 mounted thereon are radially supported by suitable bearings or bushings 700 from an outer sleeve or casing 620 so that the cylinder 614 and multi spring rings 612 may otherwise rotate freely, and centrally, relative to the casing. As shown in FIG. 4A, the outer surface 630 of the multi spring rings 612 are provided with scalloped recesses 632. The outer casing 620 of the torque meter 500 includes independent locking strips 660 corresponding to the multi spring rings 612 on the central cylinder 614. Each independent locking strip 660 can be actuated to lock a corresponding multi spring ring 612 to the outer casing 620. The locking strips 660 act upon one or more loosely-fitting balls 662 extending through the outer casing to engage the scalloped recesses 632 in the outer surface 630 of the corresponding multi spring rings 612. The locking strips 660 are actuated to lock or unlock the multi spring rings 612 by rotating a setting barrel on the outer casing 620 which axially translates respective locking strips 660 thereby to urge balls 662 into the scalloped recesses 632. Hence, rotating the setting barrel on the outer casing 620 of the torque meter sequentially locks one multi spring ring 612 after another to the outer casing 620. In this manner a user may select the torque setting of the torque meter 500 as desired. Torque applied from the hub section 616 is transferred through the locked multi spring rings 612 to the outer casing 620 and vice versa.

The torque limiter 10 of the present invention provides significant advantages over the prior art devices. For example, the torque limiter 10 allows for extensive modularization (i.e. torque limiters may be stacked) using duplicate parts for an entire range of torque applications. The torque limiter 10 of the present invention is small enough to serve space-limiting applications otherwise not possible for prior art devices. The torque limiter of the present invention has dramatically less inertia of all parts, allowing operation at much higher speeds than the prior art. Accordingly, the torque limiter 10 may be mounted/installed in a rotary power system before any step down/reduction in the rotational speed of the rotary system (i.e. near the motor). This allows for easier/faster hook-up to existing equipment. The torque limiter 10 also provides almost digital like torque-setting increments far closer than that available with the torque limiters of the prior art. In addition, unlike the prior art limiters, once tripped, the torque limiter 10 of the present invention immediately resets itself and does not stay tripped. The percentage of working material used by the torque limiter of the present invention is much higher than that of the prior art torque limiters, allowing the instant torque limiter to have an efficiency which is at least an order of magnitude greater than torque limiters of the prior art. For example, the torque limiter 10 of the present invention may have a weight of about 0.14 lbs. to deliver about 200 in lbs. of torque. Torque limiters of the prior art having a similar torque capacity weigh more than several pounds.

The torque controller 10, 100 of the instant invention overcomes the problems of the prior art. The torque controller 10, 100 of the present invention is neither a friction or a detent type. The full function torque controller as described above combines some of the best functions of both friction and detent limiters: a modular product with a complete range of functions built into one standard device, capable of substantially infinite adjustment on-the-fly, with electronic programmable controls, providing dramatic reduction of weight, size and cost, and facilitating other possibilities as yet unexplored. The full function torque controller (FFTC) offers dramatic reduction in weight, size, and manufacturing cost. It can operate at motor speed as well as reduced speed, and can change overload setting in a substantially infinitely variable mode while operating under load. It can be programmed to release the overload and reset to zero torque, or maintain the overload at the set transmission torque without diminution up to about 3000 RPM or more. The FFTC is intended to be utilized over a broad spectrum of mechanical power machinery. The torque generated with the full function torque controller of the present invention is predictable, repeatable, linear, constant over time, and pre-calibrated at the factory.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A torque coupler for coupling rotatable inner and outer parts, the coupler comprising:
    an inner and outer slip section that can slip relative to each other in one direction only;
    wherein the inner and outer slip sections are flat and of equal thickness for the purpose of stacking said sections to increase the torque carrying capability of the coupler;
    wherein an inner slip section connected to the inner rotatable part to rotate with the inner part when the inner part is rotating, the inner slip section having an outer circumferential surface disposed around the inner part, the outer surface having a predetermined number of detents formed therein; and
    an outer slip section connected to the outer rotatable part to rotate with the outer part when the outer part is rotating, and seated against the inner slip section with an inner surface of the outer slip section in contact with the outer surface of the inner slip section;
    wherein the inner surface of the outer slip section has a pre-determined number of spring-loaded teeth which are biased for engaging detents in the outer surface of the inner slip section to lock the inner slip section and the outer slip section and transfer an applied torque between the inner and outer parts;
    wherein the outer surface of the inner part has a pre-determined number of detents which are generally asymmetrical V-shaped profile formed by a stop surface and a cam surface having to be angled to allow cooperation only with the tip and bottom surface of the teeth on the outer slip section;
    wherein the stop surface of the V-shaped profile prevents the outer slip section from rotating in both directions relative to the inner slip section; and
    wherein outer slip section has keys on its outer perimeter to permit imbedding said outer slip section into outer rotatable part and wherein inner slip section has keys on its inner perimeter to permit imbedding said inner slip section into inner rotatable part.

2. A torque coupler in accordance with claim 1, wherein when the applied torque exceeds a predetermined amount, the spring loaded teeth resiliently disengage the detents allowing the outer slip section to slip relative to the inner slip section for reducing torque transfer between the inner and outer parts.

3. A torque coupler in accordance with claim 2, wherein the predetermined number of detents are located in relation to the predetermined number of spring loaded teeth such that when the outer slip section is slipping relative to the inner slip section, the torque coupler continues to transfer torque between the inner and outer parts at substantially the predetermined amount.

4. A torque coupler in accordance with claim 2, wherein when the applied torque drops below the predetermined amount the spring loaded teeth in the outer slip section automatically reengage the detents in the inner slip section to lock the outer and inner slip section, the spring loaded teeth reengaging the detents substantially instantaneously in comparison to rotational speed of the inner and outer parts.

5. A torque coupler in accordance with claim 1, wherein the inner slip section comprises a one-piece ring member, the detents being equally distributed around a circumference of the ring member.

6. A torque coupler in accordance with claim 2, wherein the outer slip section comprises a one-piece ring member, the ring member having an outer hoop section and a predetermined number of spring fingers depending radially inwards from the hoop section.

7. A torque coupler in accordance with claim 6, wherein each of the spring fingers has a corresponding one of the teeth of the outer slip section at a tip of the spring finger.

8. A torque coupler in accordance with claim 7, wherein the spring fingers projecting radially inwards from the hoop section are raked radially from the hoop section in a direction of rotation of the rotatable inner and outer parts.

9. A torque coupler in accordance with claim 7, wherein when the applied torque exceeds the predetermined amount, the teeth on the spring fingers are cammed upwards by cam surfaces of the detents, flexing the spring fingers so that the teeth disengage the detents.

10. A torque coupler in accordance with claim 6, wherein each spring finger has a generally tapered shape tapering in from hoop section to tip.

11. A torque coupler in accordance with claim 6, wherein the predetermined amount of applied torque to effect slip between the inner and outer slip sections is dependent on the predetermined number of spring fingers on the outer slip section.

12. A torque limiter coupling for coupling rotatable radially spaced first and second parts, the coupling comprising;
    a first slip ring and at least one second slip section that can slip relative to each other in one direction only;
    wherein the first slip ring and second slip section are flat and of equal thickness for the purpose of stacking said sections to increase the torque carrying capability of the coupler;
    wherein a first slip ring sized and shaped to be fixedly mounted onto the first rotatable part, the first slip ring having a circumferential slip surface disposed radially between the first and second parts when the first slip ring is mounted onto the first part, the slip surface having a number of detents formed therein;
    wherein the detents of the first slip ring part are generally asymmetrical V-shaped profile formed by a stop surface and a cam surface having to be angled to allow cooperation with the profile on the second slip section;
    wherein the stop surface of the V-shaped profile prevents second slip section from rotating relative to the first slip ring in both directions and
    a second slip section sized and shaped to be fixedly mounted onto the second rotatable part, the second slip section having a predetermined number of detents that are mirror images of the detents on said first ring; and
    wherein said detents are designed to mate with first slip ring for transferring torque between the first slip ring and the second slip section;
    wherein a multiple spring member both flat and of equal thickness of the first slip ring and second slip section, shaped to be fixedly mounted onto the second rotatable part above the second slip section;
    wherein multiple spring member has resilient spring fingers extending radially and located so as to communicate with the second slip section;
    wherein the applied pressure on the outsider diameter of the multiple spring member effects the amount of torque required before second slip section slips relative to first slip ring.

13. A torque limiting coupling in accordance with claim 12, wherein each detent has a cam surface facing a direction of rotation of the rotatable first and second parts.

14. A torque limiting coupling in accordance with claim 12, wherein the tooth engaged in the corresponding detent is biased by the resilient spring finger against the cam surface of the corresponding detent until a predetermined amount of torque is applied between the first and second rotatable parts to cause the cam surface to deflect the resilient spring finger for the tooth to disengage the detent.

15. A torque coupler in accordance with claim 12, wherein:
   a support ring is connected to the second rotatable part to rotate with the second part when the second part is rotating;
   at least one second slip section being held by the support ring, the support ring holding the slip section so that a contact surface of the slip section contacts the outer circumferential surface of the inner slip ring;
   a multiple spring member held by the support ring, wherein the multiple spring member has a predetermined number of resilient spring fingers, the multiple spring member being held by the support ring to bias the resilient spring fingers against the second slip section for urging the second slip section against the inner slip ring.

16. A torque coupler in accordance with claim 15, wherein the support ring has a pair of flexible support arms, the second slip section being held between the pair of flexible support arms, the pair of flexible support arms being resiliently deflected radially outwards from the inner slip ring when the teeth on the second slip section disengage the detents on the inner slip ring.

17. A torque coupler in accordance with claim 15, wherein tips of the resilient spring fingers rest on the second slip section, and wherein when the applied torque exceeds the predetermined amount, the teeth on the second slip section are cammed upwards by cam surfaces of the detents, flexing the spring fingers so that the teeth disengage the detents.

18. A torque coupler in accordance with claim 15, wherein the support ring is movably mounted to the outer rotatable part, wherein a portion of the support ring is adapted for being moved radially inward relative to the outer part when the outer part is rotating for preloading the resilient spring fingers against the second slip section, wherein the predetermined amount of torque for effecting slip between the inner slip ring and second slip section is dependent on the preload of the resilient spring fingers.

19. A torque coupler in accordance with claim 18, wherein the multiple spring member is movable radially between the second slip section and the outer rotatable part for changing the spring bias applied by the multiple spring member against the second slip section.

20. A torque coupler in accordance with claim 18, wherein the multiple spring member is movable such that the spring bias applied on the second slip section is substantially zero, and wherein the multiple spring member is movable to fully compress spring elements of the multiple spring member.

21. A torque coupler in accordance with claim 15, wherein the multiple spring member is connected to a position adjustment mechanism for adjusting a radial position of the multiple spring member relative to the second slip pad section when both the inner and outer parts are rotating.

22. A torque limiter coupling for coupling rotatable radially spaced first and second parts, the coupling comprising:
   a first slip ring sized and shaped to be fixedly mounted onto the first rotatable part, the first slip ring having a circumferential slip surface disposed radially between the first and second parts when the slip ring is mounted onto the first part, the slip surface having a number of detents formed therein; and
   a second slip ring sized and shaped to be fixedly mounted onto the second rotatable part, the second slip ring having a predetermined number of resilient spring fingers extending radially between the first and second parts when the second slip ring is mounted onto the second part, each of the resilient spring fingers having a tooth at a tip of the spring finger for engaging a corresponding one of the detents on the first slip ring for transferring torque between the first slip ring and the second slip ring;
   wherein the first and second slip ring can slip relative to each other in one direction only;
   wherein the detents of the first slip ring part are generally asymmetrical V-shaped profile formed by a stop surface and a cam surface having to be angled to allow cooperation with the tip and bottom surface of the teeth on the second slip ring;
   wherein the stop surface of the V-shaped profile prevents second slip ring from rotating relative to the first slip ring in both directions.

23. A torque limiting coupling in accordance with claim 22, wherein each detent has a cam surface facing a direction of rotation of the rotatable first and second parts.

24. A torque limiting coupling in accordance with claim 23, wherein the tooth engaged in the corresponding detent is biased by the resilient spring finger against the cam surface of the corresponding detent until a predetermined amount of torque is applied between the first and second rotatable parts to cause the cam surface to deflect the resilient spring finger for the tooth to disengage the detent.

25. An adjustable torque limiting coupling for coupling rotatable radially spaced first and second parts, the coupling comprising:
   a housing adapted to be fixed mounted to the first rotatable part to rotate with the first part;
   a slip ring disposed in the housing, the slip ring having a bore therein for mating the slip ring to the second rotatable part to rotate with the second rotatable part, the slip ring having a circumferential slip surface radially spaced relative to the second part when the slip ring is mated to the second part, the slip surface having a number of detents formed therein;
   a slip assembly connected to the housing to rotate with the housing, the slip assembly interfacing radially between the slip ring and the housing, and comprising a slip pad with a predetermined number of teeth, and a multiple spring member biasing the slip pad against the circumferential slip surface of the slip ring and engaging the teeth of the slip pad to the detents on the slip ring; and
   a spring preload adjustment mechanism connected to the housing for adjusting a spring preload of the multiple spring member against the slip pad, the spring preload adjustment mechanism being adjustable when at least one of the first or second rotatable parts is rotating.

26. An adjustable torque limiting coupling in accordance with claim 25, further comprising a controller connected to the spring preload adjustment mechanism for controlling the spring preload applied by the multiple spring member against the slip pad.

27. An adjustable torque limiting coupling in accordance with claim 25, wherein the spring preload adjustment mechanism is adjustable so that the spring preload of the multiple spring member against the spring pad is substantially zero, or spring elements of the multiple spring member are fully compressed.

28. An adjustable torque limiting coupling in accordance with claim 25, wherein the spring preload adjustment mechanism comprises a linear roller cam assembly disposed between the housing and multiple spring member for camming the multiple spring member radially between the slip pad and the housing.

29. An adjustable torque limiting coupling in accordance with claim 28, where the spring preload adjustment mechanism comprises a linear actuator assembly connected to the linear roller cam assembly, the linear actuator assembly being operated by a motor for generating a linear input to the linear roller cam assembly. wherein the linear input to the linear roller cam assembly is converted by the cam assembly to a radial movement of the multiple spring member.

30. An adjustable torque limiting coupling in accordance with claim 29, wherein the linear roller cam assembly is connected to the housing to rotate with the housing, and wherein the linear actuator assembly has a rotatable section connected to the linear roller cam assembly to rotate with the linear roller cam assembly, and a fixed portion remaining substantially fixed when the housing is rotated, and wherein the fixed portion of the linear actuator assembly is connected to the motor.

\* \* \* \* \*